United States Patent [19]

Nylander

[11] 4,358,189
[45] Nov. 9, 1982

[54] PHOTOMETRIC SENSING MODULE

[76] Inventor: John P. Nylander, 421 Niagara St., Denver, Colo. 80220

[21] Appl. No.: 160,274

[22] Filed: Jun. 17, 1980

Related U.S. Application Data

[63] Continuation of Ser. No. 931,237, Jul. 3, 1978, abandoned.

[51] Int. Cl.³ ............................................. G03B 29/00
[52] U.S. Cl. ...................................... 354/81; 354/72; 354/293
[58] Field of Search ................... 354/81, 293, 110, 68, 354/69, 72; 352/4, 243

[56] References Cited

U.S. PATENT DOCUMENTS

| | | | |
|---|---|---|---|
| 384,151 | 6/1888 | Gould | 362/16 |
| 724,085 | 3/1903 | Collins | |
| 1,751,774 | 3/1930 | Trullinger | |
| 1,826,299 | 10/1931 | Chamberlin | 354/72 |
| 1,900,020 | 3/1933 | McCandless | 354/293 |
| 2,224,143 | 12/1940 | Cornelius | |
| 2,239,201 | 4/1941 | Pyzel | 354/81 |
| 2,275,687 | 3/1942 | Schubert | |
| 2,431,825 | 12/1947 | Pollock | 354/81 |
| 2,433,133 | 12/1947 | Lindsey | 354/293 |
| 2,763,456 | 9/1956 | Breer | |
| 2,813,456 | 11/1957 | Ostrov | 354/293 |
| 2,882,790 | 4/1959 | Broms | 354/293 |
| 2,926,559 | 3/1960 | Oppenheimer | 352/4 |
| 3,017,817 | 1/1962 | Sampson | |
| 3,228,283 | 1/1966 | Fulton, et al. | |
| 3,371,589 | 3/1968 | Whittlesey | |
| 3,396,649 | 8/1968 | Bishop, et al. | 354/81 |
| 3,586,278 | 6/1971 | Simons | |
| 3,709,119 | 1/1973 | Van Der Meer | |
| 3,742,835 | 7/1973 | Bahnsen | |

OTHER PUBLICATIONS

*Photography In Archaelogical Research,* 1975 "Underwater Photography & Photogrammetry" pp. 265-269 University Of New Mexico Press, 352-243.

*Primary Examiner*—Monroe H. Hayes
*Attorney, Agent, or Firm*—John E. Reilly

[57] ABSTRACT

A photographic sensing module comprises a substantially rigid frame having legs diverging away from a camera mount; and an outer enclosure excludes the camera lens from exposure to external light while evenly diffusing the light from an internal light source mounted within the module, the legs serving as markers for the instrument. A portion of the frame defines the angle of view of the camera lens and diffuses the light evenly over the subject plane while excluding it from direct exposure to the camera lens. The subject plane is divided into generally rectangular grid segments of predetermined size, and a camera is spaced in relation to each segment such that the angle of view corresponds to the size of the grid segment. Special reference markers identify the periphery of each grid segment to be photographed, the camera is successively positioned to photograph each grid segment, and the images of the grid segments are reassembled into a photomosiac of the subject area.

11 Claims, 6 Drawing Figures

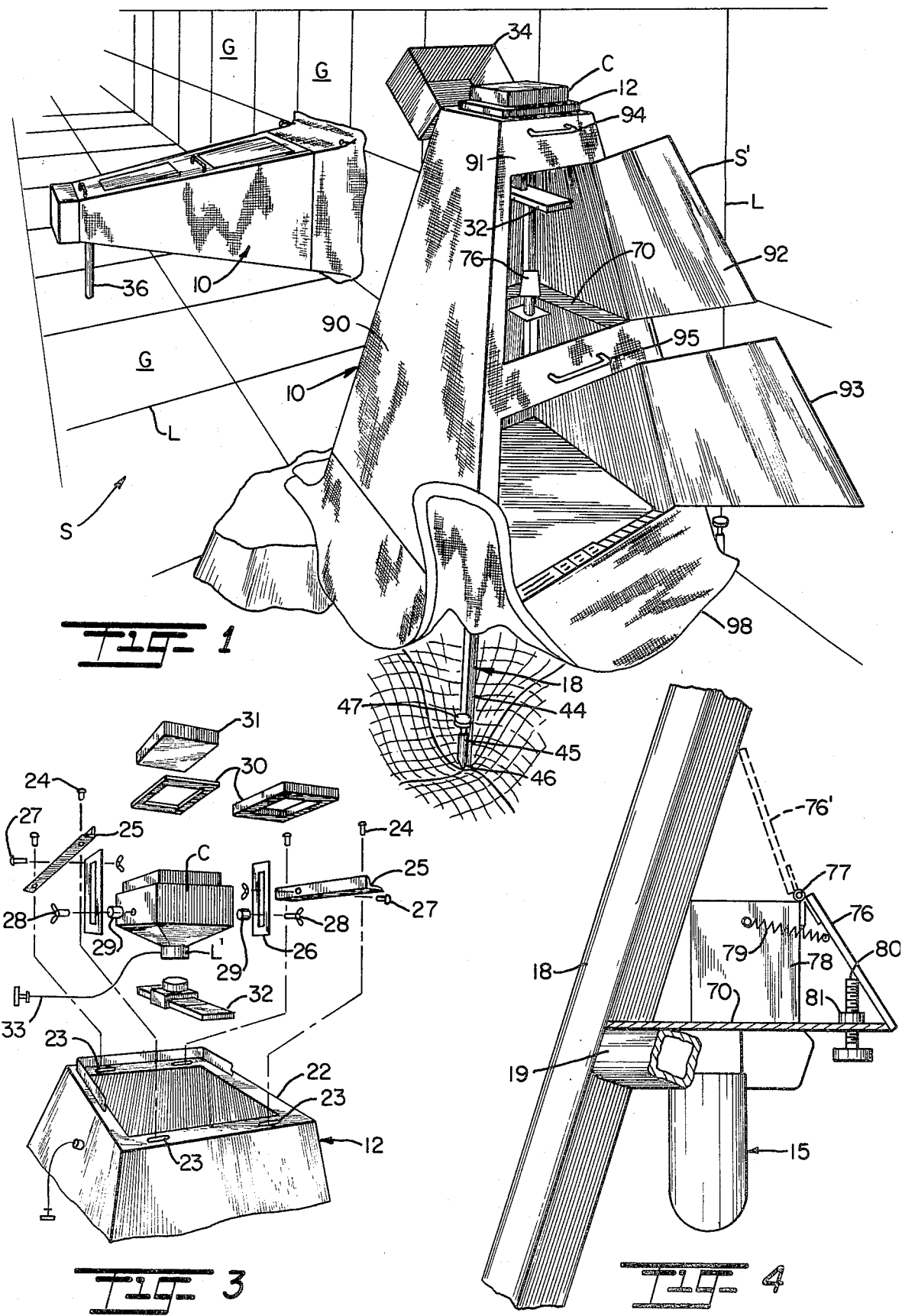

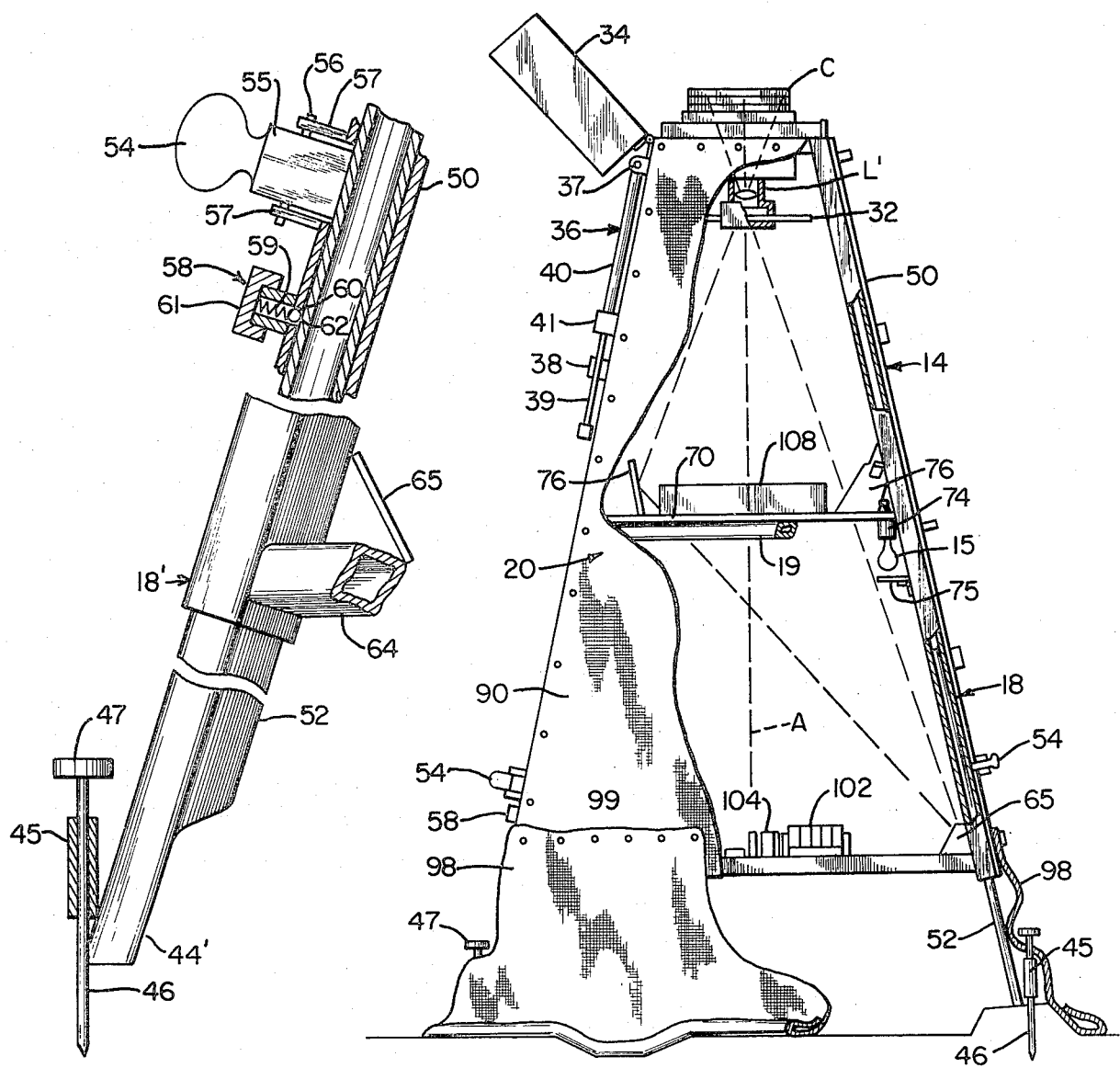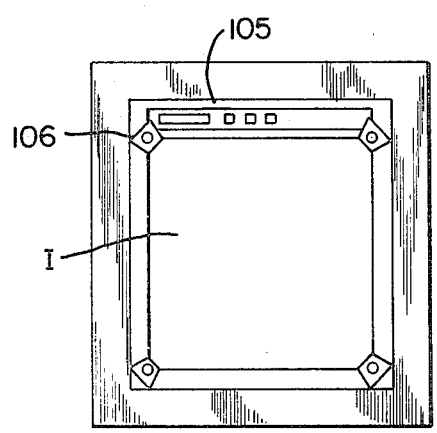

PHOTOMETRIC SENSING MODULE

This application is a continuation of Ser. No. 931,237, filed July 3, 1978, for "PHOTOMETRIC SENSING MODULE" now abandoned, invented by John P. Nylander.

This invention relates to close-range photogrammetry and multi-spectral sensing; and more particularly relates to a novel and improved photometric sensing module and method of photographing a series of grid segments making up a subject area and assembling the images of the grid segments into a photomosiac of the entire area. The present invention is specifically adaptable for use in close-range terrestrial, subterranean and underwater photogrammetry for the purpose of achieving non-destructive testing and recording of delicate, rare or excessively hot, cold or toxic subjects in place, such as, required for geological, archeological, palaeontological or industrial studies.

BACKGROUND OF THE INVENTION

Photogrammetry may be defined as the art or science of obtaining reliable information about physical objects through the technique of recording, measuring and interpreting photographic images and, although photogrammetry has been recently expanded to include analysis of other types of sensing, photographs remain as the principal source of information. In metric photogrammetry, precise measurements and computations are made to determine the size and shape of objects photographed, these photographs being normally exposed so that the field of view covered by each successive photograph overlaps or partially duplicates a part of the coverage from the previous photo, but from a different camera position. Thus an overlapping pair of photographs is generally termed a "stereo pair". Photogrammetry may either be aerial or remote; i.e. when taken from an airborne camera or other remove point; or may be terrestrial or "close-range" when taken from an earth-based camera which is relatively near the object to be photographed. Customarily, photogrammetry has been employed for the preparation of planemetric and topographic maps from aerial photography. More recently however such technology has been applied to the measurement of objects at close range; and the present invention is directed primarily to a solution of problems associated with close range photogrammetry.

It is generally known that laterally contiguous photographs can be taken at uniform distances from a desired plane in order to assemble a photomosiac of objects in that plane. For instance, in aerial reconnaissance work, determination of the subject-to-image distance is possible through various mathematical controls requiring computation before or after each exposure is made in order to match adjacent photographs. However, the advantage of extensive coverage provided by remote camera platforms is offset by the limitations of commercially available photosensitive materials which will adequately record the images; also remote camera platforms rely to a great extent on good weather and sunshine for the desired lighting of the subject. On the other hand, in close-range photogrammetry, often meaningless parts of the instruments or their shadows are in the field of view. Interiors, confined spaces, walls and vertical faces are inaccessible to close-range camera platforms and in most cases such devices are capable of photographing only on a horizontal or substantially horizontal plane. Further, while being ground-supported, close-range camera mounts are not fixed rigidly and a series of cameras are required to simultaneously photograph a desired subject for multispectral exposures. Moreover, either in aerial or close-range photogrammetry, when correct photographic exposure of the photosensitive materials is dependent upon a determination of the intensity of natural, atmospheric or solor radiation, that radiation is subject to numerous influences beyond the control of the operator and which are difficult to measure or calculate, especially when recording is done in bands or segments of the electromagnetic spectrum which is invisible to the human eye. Accordingly, it is highly desirable to provide a camera sensing module specifically adaptable for close-range photogrammetry which is portable, compact, self-contained and easily operated, manuevered and controlled. Further in close-range photogrammetry, it is desirable to minimize to the point of substantially eliminating mathematical computations so as to permit simple and inexpensive photogrammetry techniques to be applied and to avoid reliance upon spacial rectification procedures before or after photographing relatively uniform surfaces. Although overlapping or stereo pairs of photographs can be easily obtained for precise determination of object locations through high order post-exposure measuring instruments, it is desirable to provide a simple, relatively inexpensive sensing module and technique which emphasizes more the advantages of increased spectral or color resolution through precisely controlled lighting of the subject in close proximity to the camera and to place all camera controls as well as that segment of the subject area to be photographed within the direct reach of a single operator.

SUMMARY OF THE INVENTION

It is therefore an object of the present invention to provide for a novel and improved method and apparatus for the systematic recording and analysis of the visual appearance of a subject over a relatively broad subject area which requires a combination of a series of images into a photomosiac of the entire subject area.

It is another object of the present invention to provide for a novel and improved photometric sensing module which is specifically adaptable for close-range photogrammetry and which places all camera controls as well as that section of the subject area to be photographed within the direct reach of a single operator.

It is a further object of the present invention to provide for a novel and improved photometric sensing module in which diffused light energy is distributed evenly over the subject being photographed while excluding the subject from exposure to external light so that the quality of lighting is consistent across not only a single subject but a series of subjects being photographed thereby achieving continuity between adjacent photographic tiles or grids when combined in mosiac fashion; and further wherein adjacent grids photographed will permit matching tonal and color appearance and permit accurate comparison from grid to grid notwithstanding that the grids are photographed at different times and under different conditions.

It is a further object of the present invention to provide for a photographic sensing module including a novel and improved camera support and enclosure which is readily conformable for use in different subject planes whether horizontal, oblique or vertical and which will facilitate advancement of a camera successively along a series of grid segments with accurate reference markings between segments so as to permit a combination of the images of the segments into a photomosiac of the entire subject area to be photographed.

A still further object of the present invention is to provide for a novel and improved camera support which is simple, self-contained, easily operated and transported or advanced along a given subject area and which is conformable for use with a wide variety of cameras, sensors, image-forming devices and radiation sources; and further wherein the camera support is economical to construct, assemble, and maintain in requiring a minimum number of parts in construction and a minimum of adjustment in actual use.

It is an additional object of the present invention to provide for a novel and improved method for taking multiple, spectral photographs sequentially over an intermittent period of time in such a manner that the image segments produced may be accurately and economically reassembled into a precise photomosiac of the overall appearance of an entire subject area; and further to provide a method of facilitating precise close-range photogrammetry of subjects located in exposed, confined or enclosed areas whether in a horizontal, oblique or vertical plane.

In a preferred embodiment of the present invention, a camera support is comprised of a plurality of leg members which depend from and diverge away from a camera mount in equally spaced relation to one another, the legs being rigidly interconnected by a combination of crossbars and an outer enclosure which when unified with the legs and crossbars forms a rigid, fully enclosed frame. However, at least a lower portion of the enclosure is comprised of a flexible skirt which together with a telescoping adjustment means provided for at least certain of the legs affords some adjustment in length of selected leg members as well as the lower end of the closure in order to compensate for uneven surfaces to be photographed.

The resultant frame and camera support as defined is also characterized in that it will fully exclude any external light, but is provided with a self-contained light source which is so mounted with respect to the camera as to be diffused evenly over the subject area to be photographed. Specifically, the rigid frame is positioned over the subject area to be photographed and through the self-contained light source in combination with the internal construction of the frame will present a predetermined angle of view through the camera. Various types of cameras may be employed with only slight modification required to the camera mount to accommodate different cameras. In each case however the camera is mounted so that its lens has its optical axis substantially coinciding with the longitudinal axis passing through the center of the frame equidistant from the legs. The internal surface of the enclosure is provided with a light diffusing material, and the crossbars also cooperate in serving as a baffle plate to prevent direct exposure of the camera lens to the light source.

In a preferred application of the present invention to archeological work where the terrain to be photographed may have some non-uniformity or uneven surfaces, a specially devised fiducial marking or reference point system is incorporated into the frame consisting of a series of mirrors hingedly mounted on the baffle plate at selected locations to reflect the positions of fiducial markers which are mounted on each of the legs. On even terrain, the remote or distal ends of the legs may serve as proper coordinate markings at the corners or outer perimeter of the image produced by the camera; however, where uneven surfaces are encountered and some adjustment must be made in the length of selected legs, the fiducial markings being a set length from the camera will more accurately represent the outer perimeter of the image. Thus the mirror or reflecting system is so mounted as to permit movement between an out-of-the-way position where it is desired to employ the distal ends of the legs as the marking points and an operative position wherein the mirrors will reflect the fiducial markings to represent the location of each respective distal end of a leg. Moreover, within the predetermined angle of view established within the camera support, other identification means may be positioned so as to be produced as a part of each image, including numerical markings as well as tilt angles of the surface being photographed.

In photographing a given area, the area is divided in accordance with conventional practice into a plurality of grid segments of predetermined size, the camera support is positioned in centered relation over each segment such that the angle of view of the camera lens corresponds to the sides of the grid segments and the entire segment to be photographed is thereby enclosed so as not to be exposed to any light other than the artificial lighting within the camera support, the artificial lighting being diffused evenly over the grid segment to be photographed, and spacial reference markers are positioned within the angle of view of the camera lens so as to identify the outer limits of each grid segment; other identification means may be provided to identify the location of each grid segment. As a result, in advancing the camera support and attached camera in a predetermined pattern or order with the outer peripheral limits of each grid segment being accurately defined, the images of the grid segments may be rapidly but accurately assembled into a photomosiac of the entire area. Where the surface being photographed is uneven, fiducial markers are positioned at a fixed distance from the camera lens in such a way as to represent the outer peripheral limits or corners of each grid segment to be photographed.

The above and other objects, advantages and features of the present invention will become more readily appreciated and understood from a consideration of the following description when taken together with the accompanying drawings, in which:

BRIEF DESCRIPTION OF THE DRAWINGS

FIG. 1 is a perspective view illustrating the construction and disposition of a preferred form of camera support when disposed on a relatively flat, horizontal subject area and further illustrating an alternate disposition of the preferred form of camera support with respect to the subject area disposed more on a vertical plane, all in accordance with the present invention.

FIG. 2 is a front view in elevation with portions of the camera support broken away to illustrate the interior of the camera support.

FIG. 3 is an exploded view illustrating a preferred form of camera mount forming a part of the camera support.

FIG. 4 is a fragmentary view in detail of the preferred form of reflector and light source arrangement employed in the camera support of the present invention.

FIG. 5 is a fragmentary view in detail of a preferred adjustable leg construction employed in accordance with the present invention; and FIG. 6 is a schematic view representing the outline of an image area or grid segment photographed.

DETAILED DESCRIPTION OF THE PREFERRED EMBODIMENT

Referring in detail to the drawings, there is illustrated in FIG. 1 a sensing module 10 which is specifically adapted for use in supporting a camera represented at C in close-range photogrammetry operations. For the purpose of illustration and as a setting for the present invention, a predetermined section or area of terrain, hereinafter referred to as the subject area to be photographed, may either be located on a substantially horizontal plane as represented at S or at some angle to the horizontal as represented at S'. For example, in archeological studies, the subject area would be made up of a predetermined section of terrain believed to contain prehistoric information where analysis of that area would require both accurate photographing of individual grid segments G making up that area as well as multi-spectral sensing of the make-up of a geological structure or matter contained within each grid segment. For this reason, in the determination of the outer peripheral limits of each grid segment, uniformity of lighting within each grid segment as well as from segment to segment is extremely important in assembling a photomosiac from the grid segments produced of the entire subject area. In FIG. 1, the subject area is specifically prepared in accordance with well-known practice so as to remove any extraneous or loose material; however, the lines L as depicted are imaginary lines merely to illustrate the division of the subject area into coordinates or rectangular segments which correspond to the outer peripheral limits of the angle of view which is defined by the sensing module for the camera in successively advancing or progressing along the subject area.

In the preferred form of invention as illustrated in FIGS. 1 and 2, the sensing module 10 is broadly comprised of a camera mount 12 positioned on a rigid support frame 14 which houses an artificial light source generally represented at 15, a fiducial marking system 16 and identification system 17. The rigid support frame is characterized by having a series of four legs 18 which diverge at equal angles and in equally spaced relation to one another away from the camera mount 12, the legs being rigidly interconnected by crossbar members 19 and enclosed by outside enclosure panels 20.

The particular form of camera mount 12 is disclosed in more detail in FIG. 3 and is made up of an open rectangular frame 22 provided with aligned pairs of slotted openings 23 on opposite sides of the frame which are adapted to receive fasteners 24 for hold-down brackets 25, the latter being in the form of angle members extending in spaced parallel relation to one another across the top of the frame. Slotted vertical support plates 26 are adjustably attached by fasteners 27 to the facing surfaces of the brackets 25, and permit pivotal disposition of a camera C between the plates 26 by a second pair of fasteners 28 which are inserted through the lower ends of the slotted plates 26 into receiving bores 29 which are conventionally provided in the casing of the camera for the purpose of mounting on a conventional tripod support. Although forming no part of the present invention as such, other standard parts of a typical camera are shown including spacers 30 for focusing purposes, a film holder 31, and a filter bar 32 which is secured to the lens L' on the lower end of the camera. Also a suitable form of cable release is designated at 33 to control operation of the camera. In addition, the camera mount includes an outside cover 34 which is hinged to one side of the frame 22, for example, as shown in FIG. 2 and is adapted to close the entire camera mount and attached camera C when in use. Depending upon the specific type of camera employed, the openings 23 are slotted to permit lateral adjustment of the spacing between the brackets 25 depending upon the width of the camera C so as to permit the camera to be securely but adjustably positioned in place with the lens projecting downwardly beneath the frame 22 while making the film holder readily accessible from the upper exposed end of the mount.

A support rod 36 is also shown in FIG. 2 as being hinged as at 37 to the upper frame 22 and releasably clamped as at 38 so as to secure it to the camera support when not in use. As elaborated upon later and as further shown in FIG. 1 however the support rod cooperates with the camera support in stabilizing the module when the subject area is tilted at an extreme angle from horizontal for example in the vertical plane as illustrated in FIG. 1. Specifically, the support rod consists of inner and outer telescoping members 39 and 40 respectively with a suitable form of fitting 41 at the free end of the outer telescoping sleeve 40 to releasably engage the inner leg 39 for the purpose of locking the inner leg 39 at the desired length setting.

In order to form an open but rigid support frame for the camera mount, each of the four legs 18 diverges away from connection to each of the four corners of the upper frame 22, the legs preferably being of square tubular construction and terminating in outer free or distal ends 44 each distal end provided with a sleeve 45 for insertion of a stake 46 which is inserted through the sleeve and has an enlarged end 47 to permit each stake to be driven into the ground surface. Although each of the four legs may be of a fixed length, for example, of the type shown at one corner of the support frame in FIG. 1, preferably all four of the legs are made to be of adjustable length such as illustrated in FIGS. 2 and 5. Specifically referring to FIG. 5, the adjustable leg as designated at 18' is made up of an outer square tubular section 50 which extends for the greater length of the overall desired length of the leg and terminates in an open end which is adapted to receive an inner telescoping tubular section 52 which forms the lower distal end or extremity 44' of the adjustable leg. Again the lower adjustable end section 52 includes a sleeve portion 45 adapted to receive a stake 46. Adjustable locking of the inner leg section 52 within the outer section 50 is facilitated by a cam or toggle type locking lever 54 which includes an eccentric portion 55 rotatable about a pivot pin 56 extending through arms 57, the latter projecting laterally in spaced relation to one another from one wall portion of the outer tubular section 50. A recessed area is formed in the wall portion for inward movement of the eccentric 55 when the lever 54 is moved outwardly, for example, as shown in FIG. 5 so that the end surface of the eccentric enters through the recessed portion to firmly engage the inner tubular section 52. Cooperating with the locking lever is a spring stop 58 which includes a spring-loaded ball 59 mounted within a hollow stem 60 having an enlarged head 61 threaded onto the stem and by tightening the head the spring is biased to urge the ball through an opening in the wall of the outer tubular section 50 into engagement with a groove or depression 62 in the inner tubular section. The stop member may be released by grasping the leg and advancing in either direction to move the ball away from engagement from the groove 62 against the urging of the spring when it is desired to change the effective length of the legs. The stop member is intended to serve principally as a preliminary locating mechanism to establish a standard effective length for the leg after which the locking lever 54 is urged into its operative position to lock the inner leg at the desired length of extension downwardly from the outer tubular section 50.

The lower ends of the outer tubular sections 50 are rigidly interconnected to adjacent legs by crossbars or tubular members 64 which are welded or otherwise permanently affixed to a sidewall of each of the tubular sections 50 in the manner illustrated in FIG. 5. The tubular members 64 not only serve to aid in rigidifying the entire frame but also serve as a useful means of support for the fiducial marking system 16 which is made up of small rectangular plates or targets 65 mounted to extend at an angle between each cross tube member 64 and tubular section 50, again as illustrated in FIG. 5. Each target may suitably be provided with a center spot or other marking which will be reflected onto the camera lens in a manner now to be described. Referring to FIG. 4, the intermediate crossbar members 19 extend horizontally between adjacent legs to form an open, rigid rectangular frame. Preferably the crossbar members 19 are also of open generally rectangular cross-section and permanently affixed at their ends to the sidewalls of the legs by welding or other suitable means and also serve to support baffle plates 70 on the upper surfaces of each of the crossbar members 19, the baffle plates being elongated flat plates which traverse the entire length of each side of the frame and are of a predetermined width so as to establish the desired angle of view for the camera lens. The baffle plates are rigidly connected to the upper surfaces of the crossbar members and, as best seen from FIG. 2, the inner edges of the baffle plates 70 will determine the sight or angle of view of the camera lens when it is centered with its optical axis coinciding with the longitudinal axis indicated at A of the support frame. The crossbar members 19 together with the baffle plate 70 also provide means for suspension of artificial lighting 15 and which may suitably take the form of a light socket 74 depending downwardly from each of the four corners of the baffle plates at their juncture with the legs so that the lights are shielded and face downwardly away from the baffle plates towards the subject area to be photographed. In this manner the camera lens is shielded from direct exposure to the light sources. If desired a suitable light diffuser plate or flare blind 75 is hinged beneath each of the light sources and where not required can be swung into a vertical, out-of-the-way position behind the light source or disposed to extend horizontally beneath the light source to aid either in diffusing or filtering the light as required.

The fiducial marking system 17 includes light-reflecting mirrors 76 which are stationed at each of the four corners of the baffle plate and are so positioned as to project the images of the targets onto the camera lens each time that a segment is photographed. From a consideration of FIG. 4, it will be seen that each light reflecting mirror 76 has a spring member 79 and is hinged by a hinge member 77 to the upper corner of a support block 78 disposed on a baffle plate 70 so as to be pivotal between an upper inoperative position as designated at 76′ and a lower operative position as shown in full where each mirror will reflect the fiducial marking on a diagonally opposed target in the manner represented by the dotted lines shown in FIG. 2. A threaded stem 80 projects upwardly through each baffle plate 70 and includes a lock nut 81 in order to adjustably position the angle of the mirror so as to properly reflect the fiducial marking onto the camera lens. Specifically the upper end of the threaded stem 80 bears against the back of each mirror so that when the stem is locked in position it will establish the desired angle of the mirror and secure the mirror in position as the frame is being shifted about or moved to different positions for photographing a succession of grid segments.

The rigid support frame as described is enclosed by the enclosure panels 20 which, as shown in FIGS. 1 and 2, include solid panel sections 90 which cover three sides of the support frame and extend from the upper frame 22 down to a point aligned with the lower extremities of the outer tubular sections 50 of the two adjustable legs. A fourth enclosure panel 91 similarly extends across one side of the frame and is provided with upper and lower hinged access doors 92 and 93, respectively, which permit communication with the interior of the camera support. Although not shown, suitable latches may be provided on the door panels to permit them to be tightly secured in the closed position, and upper and lower grasping handles 94 and 95 are provided on the access door panel 91 and the opposite enclosure panel 90 to facilitate lifting and movement of the camera support. The lower enclosure of the frame along the lower portion of the camera support beneath the outer tubular section 50 is completed by a flexible skirt 98 which is affixed to the lower edge of each of the enclosure panels 20 by fasteners 99, as shown in FIG. 2. Hooks, not shown project from the sidewall of each of the tubular sections 50 through the enclosure panels to permit the skirt 98 to to be raised at the corners. As further illustrated, the skirt is of a length such that it will lay against the ground surface and together with the rigid enclosure panels will prevent entry of external light into the interior of the camera support so that the lighting for the subject to be photographed is fully controlled by the artificial light source.

A discussion of the lighting system will be helpful to an understanding of the present invention and ability to achieve uniformity in photographing a succession of grid segments or images. The baffle plate or matte shelf 70 divides the camera support into a lower integration chamber and an upper radiation sink or absorption chamber, the latter formed by the walls of the module enclosure, the camera lid or cover and the upwardly facing surfaces of the baffle plate. In this upper radiation sink, the internal surfaces and components of the camera lid, module enclosure panels and upper surfaces of the baffle plates are coated with a suitable substance, such as black paint, velvet or felt so as to absorb as much radiant energy as possible and to prevent any sink wall reflections from straying through the camera lens and causing any glare or flare. The light sink is provided with the hinged cover lid 34 which affords access to the camera for loading purposes, and the upper access door 92 affords access to change or adjust the filter bar shutter 32 as well as for cocking the film advance and other camera controls. Of course this door is closed during exposure. In turn, the lower integration chamber defined by the under-surface of the baffle plate, the inner surfaces of the enclosure panels beneath the baffle plate including the lower access door 93, and the lower skirt 98 is basically designed to conserve energy emanation by directing and redirecting that energy or light towards the subject. Redirection of the light permits a small lens aperture to provide the desired depth of field and thus minimizing any differential focusing of infrared or ultraviolet light rays. To this end, the lower section of the module which defines the integration chamber has its inner surfaces coated with a highly reflective but light-diffusing substance such as a permanent white reflective coating or white linen so that the angle of linear reflectance returning from the substance is randomly diffused and preventing from equalling the angle of incidence of that energy striking the inner walls of the chamber. The radiation source mountings also include the flare blinds which prevent linear radiation from reflecting directly off of the subject and entering the camera lens to record as specular reflections.

The light sources 15 which specifically are designed for electromagnetic energy emission may be compact, quartz-enclosed incandescent bulbs or bare tube electronic flashes. Quartz light sources are particularly necessary for ultraviolet reflection photography in the region of 200 to 300 nanometers. When fitted with electronic flash sources, a battery pack is attached to the module framework on the exterior of the housing and are electrically connected to the light sources. As described, the mountings for such sources are located beneath the baffle plate out of camera view at the four corners of the baffle and are suitably attached by means of screw fasteners, not shown. This mounting location precludes direct exposure of the lens to the light sources but by means of the light diffusing composition of the interior of the enclosure panels including the skirts, the light is evenly diffused across the subject plane thus minimizing the effect of inverse square of intensity propagation of energy from a point source. In other words, the integrating chamber formed within the camera support prevents those areas located in front of or behind the subject plane from recording excessively light or dark in comparison to the areas located on the ideal subject plane itself. The diffusion of light across the subject plane allows a relatively small lens aperture to provide the desired depth of field thus minimizing differential focusing of infrared or ultraviolet light rays. To this end, the integrating chamber inner surfaces are coated with a highly reflective but diffusing substance so that the angle of linear reflectance of energy returning from the substance is randomly diffused and thus prevented from equalling the angle of incidence of that light striking the inner walls of the chamber. The flare blinds 75 as described prevent linear radiation from reflecting directly off of the subject and entering the camera lens. The extendible and pliable flaps or skirting as described and designated at 98 may be composed of a substance such as vinyl which is opaque and similarly is coated as described with a diffusing light reflective substance on its inner surface so as to complete the enclosure of the integrating chamber around the subject plane. This skirting by being extendable and pliable will permit the operator to adjust the length of the legs or footings as described while maintaining complete isolation of the interior subject plane to be photographed from external light.

The identification system represented at 17 is broadly comprised of a manually adjustable numbering wheel generally designated at 102 which has a series of discs which can be rotated to change the numbers or digits and which numbers can be coded to correspond with the grid segments being photographed. In this connection the numbering system is merely provided as a matter of convenience and efficiency in reassembling the grid segments into the proper order in forming a photomosiac of the entire subject area. In addition, a tilt indicator 104 is provided on the lower crossbar 64 to afford a measurement of the tilt angle of the camera support when advanced to each different position. Although not shown, there may be three different tilt indicators provided so as to illustrate the angle of tilt in three different dimensions. As represented in FIG. 6, the information provided by the tilt indicators as well as the number identification will appear in the image I of the subject plane as at 105 together with the fiducial markings 106 at each of the four corners of the image which was photographed.

In use, the distal ends of the module legs are located such that the four corners as defined by the legs designate the four corners of a standardized rectangle on the ideal subject plane to be photographed. The ideal subject plane is perpendicular to the longitudinal axis of the module and therefore the rectangle defined by the leg tips of the module is centered around that axis, and further the optical axis of the camera coincides with that longitudinal axis. If the ends or tips of the legs are equidistant from the upper frame or substantially equidistant, the fiducial markers are not necessary for the purpose of defining the corners of the segment being photographed and therefore the mirrors can be pivoted to an out-of-the-way position, since the distal ends of the four legs when in their primary position will appear by means of central point projections through the optical center of the focused camera lens to be located at the four corners of the optical image formed upon the photosensitive material at the focal plane of the camera. Although the legs of the module may be telescoped to conform to irregularities in the subject surface to be photographed or allow slight tilting of the optical axis, the position of the subject rectangle corners on the primary plane can be maintained on the optical image by means of the fiducial marking system as described; specifically by advancing the mirrors 76 into their operative position they will reflect the fiducial markings onto the optical image formed thereby to permit marking of the image corners where the camera contains no provision for fiducial marking. The phantom fiducial markings specifically are located at the four corners of the rigid framework and face diagonally opposite mirrors located on the upper sides of the baffle plate. The mirrors will reflect the well lit and focused image of the fiducial marking targets into the camera and onto the film at the precise point where the corner pins would appear on the photograph. In this way, the phantom fiducial markings will prevent mislocation of reference marks with respect to picture elements as might otherwise arise from slight misalignment of the optical axis as the camera and photographic prints of each segment may be matched precisely with the reference marks of adjacent segments.

The identification system as described will permit designation of information concerning location and orientation of the field of view in terms of the three-dimensional spatial coordinates of the overall subject grid. For instance, the lettering could represent the grid rectangle's distance from an arbitrary, designated starting point for the overall grid network as well as any other physical controls for subject reflectance in the form of gray scales or otherwise appropriate coding. This information is projected to the camera lens onto the margins of the optical image of the subject by a mirror 108 mounted above the baffle plate and positioned in the same manner as fiducial marking mirrors to reflect the information concerning numerical identification and tilt angles onto the image. As a result of utilization of a mirror arrangement, the numbering on the number wheel will be inverted so that it will appear in readable form on the final print or image.

In advancing the sensing module along a given subject area to be photographed, the stakes 46 are preferably provided with sharpened ends or points which can be used to permanently mark the intersecting coordinates for the standard overall grip network. While these pins are blocked from camera view by the module legs and enclosure, they serve to make operational alignment of the module on adjacent rectangles precise and easily accomplished. Thus when the module is advanced from one grid segment to the next, the pins on the two trailing legs may be positioned to coincide with the location of the pins on the leading legs for the previous image produced. Should the subject surface be so irregular that the ends of the adjustable legs must be extended or retracted from their primary position and locked in place off of the ideal subject plane, the pins will serve to hold the module rigidly in place.

A single mounted camera can be utilized to provide stereoscopic coverage of the extended subject area by positioning the module sequentially over the subject areas so that successive images overlap. Likewise, once the module is securely positioned, a single camera or series of single cameras can be used to photograph a given subject area through various successive combinations of spectrally selective radiation sources and/or filters held in the sliding filter bar as described; or modifications may be made in the photosensitive materials and lens or image forming mechanisms as long as appropriate adjustments are made to control for such variation in equipment. During these procedures the module will maintain the subject field and demark the area being photographed for registration of the multiple images. The resultant multiplicity of photographic segments or tiles representing identical subject views may be later edge-aligned with other segments made with the same film and filter combination to produce a series of uniformly sensed overall photomosiacs.

Operation of Preferred Form of Invention

In operation, the photometric sensing module 10 is first fitted with a camera C and light sources appropriate to satisfy the needs of the particular application. The design, configuration and operation of a selected camera and radiation source may dictate suitable adjustment for their mounting and the necessary alignment of the module components particularly in the camera mount. After these preliminary preparations are complete, the invention becomes an integral part of a completely self-contained image forming and recording system or module with the possible exception of a power source for the light sources. Consequently, the variables bearing upon proper exposure of the photosensitive materials can be controlled and determined by calculations from pertinent technical information or calibration tests. From such technical or experimental test data, the operator is then prepared to choose and standardize settings for camera and lighting control which will be expected to retrieve as much information from the subject as possible. For example, a subject with low tonal contrasts may be photographed so as to permit later artificial contrast enhancement of any latent imagery. Wherever possible the subject is divided into a number of grid segments by means of markers which designate the image corners of the eventual photomosiac tiles. These grid marks correspond to the dimensions of the pin brackets on the module legs. After one of the grid rectangles or subject areas is cleaned or otherwise prepared for photography with various proven and applicable enhancement techniques such as heating, cooling, wetting or drying, the module legs are placed at the four corners of the grid square. As the surface may be uneven, the legs are adjusted to provide a stable attachment over the subject and the skirting is arranged to complete the enclosure of the integrating chamber. Before exposure, the spatial reference indicators are set to properly identify the location of the module in at least two and possibly three dimensions. After that area or segment is photographed, the module is removed, reset and aligned with the next grid segment specifically by aligning the stakes with the markings made at the previous setting as earlier described. Optimally the camera and radiation source settings will remain unchanged throughout the ensuing transverse of the subject area. Should stereo photography of uneven surfaces be desired for later viewing or photogrammetric analysis, the device may be moved to straddle grid lines and produce photos with at least 50% overlapping relationship. Alternately, by virtue of the telescoping legs, the invention when fitted with a single camera may have its axis tilted slightly while in place on a single subject rectangle in order to produce a stereoscopic photo pairs. Again in advancing from one grid segment to the next successive grid segment, the numbering wheel may be correspondingly advanced to display a new number corresponding to each next successive grid segment. Once completed, the grid segments of the entire subject area may be assembled into a photomosiac with the fiducial markings accurately representing the corners of the grid segments. Thus other than in the case where grid segments are photographed to produce overlapping images, the grid segments may be photographed without overlapping then accurately assembled into a composite photograph of the entire subject area.

While the present invention has been described in connection with a preferred embodiment thereof it will be understood that other modifications or variations may be made in the configuration and composition as well as its intended use without departing from the scope of the present invention as defined by the appended claims.

What is claimed is:

1. A photometric sensing module comprising:
a portable rigid frame having a camera mount and a plurality of legs diverging away from said camera mount in equally spaced relation to one another such that the divergent ends of said legs are adapted to rest upon a subject plane which is to be photographed, and connecting means in the form of an open frame which provides a free unobstructed view of said subject plane while rigidly interconnecting said legs in equally spaced relation to one another, at least one of said legs being adjustable in length, said connecting means disposed intermediately between said camera mount and said subject plane and defining the angle of view of said camera lens while cooperating with said enclosure means to exclude said camera lens from direct exposure to artificial light within said enclosure means, an artificial light source mounted within said frame, a camera mounted on said camera mount provided with a lens having its optical axis substantially coinciding with the longitudinal axis through said frame equidistant from said legs, enclosure means fully enclosing said frame and said camera lens from direct exposure to external light, said enclosure means provided with an internal light diffusing surface whereby to diffuse the light from said light source evenly over a subject plane upon which the outer divergent ends of said legs rest, fiducial marker means adjacent to the outer divergent end of each leg and located at predetermined, equal distances from said camera mount to represent the outer peripheral limits of each grid segment to be photographed, said fiducial marker means being arranged such that the image of said fiducial marker means is within the field of view of said camera, and means for reflecting each said image onto the camera lens to represent the location of each respective outer divergent end of a leg on the photographic image of the subject plane being photographed.

2. A photometric sensing module comprising:

a portable rigid frame having a camera mount and a plurality of legs diverging away from said camera mount in equally spaced relation to one another such that the divergent ends of said legs are adapted to rest upon a subject plane which is to be photographed, and connecting means in the form of an open frame which provides a free unobstructed view of said subject plane while rigidly interconnecting said legs in equally spaced relation to one another, at least one of said legs being adjustable in length, an artificial light source mounted within said frame, a camera mounted on said camera mount provided with a lens having its optical axis substantially coinciding with the longitudinal axis through said frame equidistant from said legs, enclosure means fully enclosing said frame and said camera lens from direct exposure to external light, said enclosure means provided with an internal light diffusing surface whereby to diffuse the light from said light source evenly over a subject plane upon which the outer divergent ends of said legs rest, and fiducial marker means adjacent to the outer divergent end of each leg and located at predetermined, equal distances from said camera mount to represent the outer peripheral limits of each grid segment to be photographed, said fiducial marker means being arranged such that the image of said fiducial marker means is within the field of view of said camera, including a fiducial marking on each leg adjacent to its outer divergent end, means for reflecting each marking onto the camera lens to represent the location of each respective outer divergent end of a leg on the photographic image of the subject plane being photographed, and said reflecting means defined by a plurality of mirrors adjustably mounted on said connecting means, each of said mirrors adapted to be moved between a position reflecting the fiducial marking on one of said legs onto said camera means and an out-of-the-way position to permit photographing of the outer divergent end of each leg with respect to the subject plane.

3. A photometric sensing module according to claim 2, including identification means positioned within said enclosure means and within the angle of view of said camera lens to provide an identification on the image photographed of the orientation and location of each subject plane photographed.

4. A photometric sensing module according to claim 3, said identification means including the tilt angle of the subject plane.

5. A photometric sensing module according to claim 4, there being four adjustable legs defining the four corners of a rectangular image to be photographed, and said baffle plate dividing said frame into upper and lower sections, the section above said baffle plate having dark-colored internal light absorption surfaces and the section below the baffle plate having light-diffusing internal surfaces.

6. A photometric sensing module according to claim 2, said connecting means defined by a baffle plate rigidly interconnecting said legs intermediately between said camera mount and the outer divergent ends of said legs, said artificial light source being mounted on said baffle plate to extend in a direction away from said camera mount, and reflecting means mounted on said baffle plate on the side opposite to said light source.

7. A photographic sensing module according to claim 6, said baffle plate including identification means mounted thereon within the angle of view of said camera lens.

8. A photometric sensing module comprising:

a camera support including a portable rigid frame having a camera mount and a plurality of unitary legs diverging away from said camera mount in equally spaced relation to one another such that the distal ends of said legs are adapted to rest upon a subject plane which is to be photographed, and connecting means rigidly interconnecting said legs in equally spaced relation to one another, each of said legs being adjustable in length, enclosure means fully enclosing said frame and said camera lens from direct exposure in external light, said enclosure means provided with an internal light-diffusing surface adapted to diffuse the light from a light source evenly over a subject plane upon which the distal ends of said legs rest;

an artifical light source disposed within said camera support;

a camera mounted on said camera mount provided with a lens having its optical axis substantially coinciding with the longitudinal axis through said frame equidistant from said legs;

connecting means providing a free unobstructed view of said subject plane while excluding artificial light from direct exposure to said camera lens within said enclosure means; and a fiducial marking on each leg adjacent to its outer divergent end, means for reflecting each marking onto the camera lens to represent the location of each respective distal end of a leg on the photographic image of the subject plane being photographed, said reflecting means including a plurality of mirrors adjustably mounted on said connecting means, each of said mirrors adapted to be moved between a position reflecting the fiducial marking on one of said legs onto said camera means and an out-of-the-way position to permit photographing of the outer divergent end of each leg with respect to the subject plane.

9. A photometric sensing module according to claim 8, said connecting means defining the angle of view of said camera lens while cooperating with said enclosure means to exclude said camera lens from direct exposure to artificial light within said enclosure means, said enclosure means including a lower flexible skirt in outer surrounding relation to said legs whereby to permit the distal ends of said legs to be photographed to designate the outer peripheral limits of the subject plane being photographed.

10. The method of sequentially photographing grid segments of a subject area and precisely combining into a mosiac of the subject area comprising the steps of:
    (a) dividing the subject area into a plurality of rectangular segments of predetermined size,
    (b) positioning a camera in predetermined spaced relation to each segment such that the angle of view of the camera lens corresponds to the sides of each said segment,
    (c) enclosing the space between said camera lens and grid segment to be photographed so as to exclude external light, and positioning an artificial light source within the enclosed area to diffuse the light within the space evenly over each grid segment as it is photographed,
    (d) placing fiducial markers at points spaced above each segment to be photographed at a point corresponding to the outer peripheral points of said grid segment to be photographed, and
    (e) reflecting images of said markers when each respective segment is photographed so that the markers appear in the image to define the outer peripheral points of the segments photographed.

11. The method of sequentially photographing grid segments of a subject are and precisely combining into a mosiac of the subject area comprising the steps of:
    (a) dividing the subject area into a plurality of rectangular art segments of predetermined size,
    (b) positioning the camera in predetermined spaced relation to each segment such that the angle of view of the camera lens corresponds to the sides of the grid segment,
    (c) enclosing the space between said camera lens and grid segment to be photographed so as to exclude external light,
    (d) positioning an artificial light source within the enclosed area to diffuse the light within the space evenly over each grid segment as it is photographed,
    (e) dividing the enclosed space into a light absorption space relatively near the camera and a light-diffusing spaced relatively near the subject area and away from the camera,
    (f) placing fiducial markers at points spaced above each grid segment to be photographed at a point corresponding to the outer peripheral points of said grid segment to be photographed, and reflecting images of said markers when each respective grid segment is photographed so that the markers appear in the image to define the outer peripheral points of the grid segments photographed, and
    (g) aligning said camera with respect to each grid segment to be photographed in succession in accordance with steps (a) to (f) above.

* * * * *